United States Patent [19]

Bergamini

[11] 4,184,081

[45] Jan. 15, 1980

[54] METHOD FOR CHECKING BANKNOTES AND APPARATUS THEREFOR

[75] Inventor: Giorgio Bergamini, Bari, Italy

[73] Assignee: Nuovo Pignone S.p.A., Florence, Italy

[21] Appl. No.: 846,545

[22] Filed: Oct. 28, 1977

[30] Foreign Application Priority Data

Nov. 3, 1976 [IT] Italy .............................. 28981 A/76

[51] Int. Cl.[2] ................................................ G06K 5/00

[52] U.S. Cl. ....................................... 250/556; 356/71

[58] Field of Search .................. 250/556, 567; 356/71; 307/355, 357; 328/147

[56] References Cited

FOREIGN PATENT DOCUMENTS 2150910 4/1972 Fed. Rep. of Germany ............ 356/71

981100 1/1965 United Kingdom .................... 250/556

*Primary Examiner*—James B. Mullins

*Attorney, Agent, or Firm*—Morgan, Finnegan, Pine, Foley & Lee

[57] ABSTRACT

A method and a machine are disclosed, for checking a banknote to determine its genuineness, wherein light-sensitive elements scan a few read out points on a banknote and amplifies the signals so produced up to a normalized maximum, the machine then computing the average of all the normalized read out values and detecting the deviation relative to said average, and finally checking that such errors or deviation from the average lie within preselected calibration ranges which are predetermined on a statistically significant number of genuine banknotes.

20 Claims, 2 Drawing Figures

METHOD FOR CHECKING BANKNOTES AND APPARATUS THEREFOR

This invention relates to a method for checking banknotes, said method being based on the error or deviation of read out and normalized values relative to the mean values, permitting to achieve a high degree of selectivity and thus enabling to discard any forged banknote. The invention is also realized with an apparatus, the circuitry of which is simple and cheap, for carrying said method into practice.

As is known, the checking of a banknote is effected, according to the known art, by measuring with photodiodes or other photo-sensitive elements, the intensity of a reflected light or of light which passes through the banknote in correspondence with a preselected set of readout points on said banknote, which have different colour shades or brightness and by merely checking that the individually read out values lie within a so-called calibration range. Stated another way, the checking step consists in making sure that all the points investigated on a banknote give values which do not depart for more than a preselected range from the sample values, said standard values being those obtained from a theoretical banknote which has not been forged and is nearly new and not too much soiled.

Now, such a checking method of conventional type involves serious selectivity problems which substantially lead to the virtual impossibility of passing a high number of genuine banknotes, if possible the 100%, while simultaneously rejecting all the forged pieces. As a matter of fact, the genuine banknotes presented to checking by the users can be more or less nearly printed as a function of the quality of the inks and the paper reams as used by the Mint, and can, at the same time, be more or less worn, creased or merely soiled, so that the same readout point can give values which are even considerably diverging from a banknote and another. It is thus apparent that a checking operation which is restricted to make sure that the individual read out values do not go beyond a preselected calibration range, cannot be such as to prevent the acceptance of even grossly forged pieces, since the calibration range for said read out values must be, of necessity, comparatively wide ones.

On the other hand, it has been practically ascertained on large amounts of samples of genuine banknotes, that the variations of color shades are virtually constant or that they vary but a little for all the readout points of a single banknote. Stated another way, if a readout point of a banknote is of a clearer shade than the corresponding points of other banknotes since the banknote is fresh from the Mint or has been printed on a clear shade or on clear paper, also all the other adjoining points of the banknote concerned will be of a clearer shade than the corresponding points of said other banknotes.

The result is that the values of the chromatic ratio between a point and another in readout, will undergo for all the banknotes much small variations than those of the absolute readout values. It is thus apparent that a banknote checking method based on the chromatic ratio values rather than on the absolute readout values would enable a high selectivity to be achieved towards the forged pieces, inasmuch as it would permit that the so-called calibration ranges may drastically be reduced. Such a method, however, has a serious drawback as regards its practical application. The performance of the ratio between two signals, in fact, requires a comparatively expensive and intricate apparatus and likewise costly would it be, in the presence of a number of read out values, to effect the checking of many, or of all, the couplewise possible ratios on account of the large number of the electronic components which would so be required.

An object of the present invention is to redress the defects aforementioned and to provide, therefore, an original method for processing and checking the values read out on a banknote, said method permitting to achieve just the high selectivity of the aforementioned method based on the variations of the chromatic ratios, though using an apparatus the circuitry of which is comparatively simple and cheap.

This result is achieved mainly for the reason that, rather than checking the absolute read out values, the chromatic ratio values are checked via the determination of the errors of deviations from the mean value of the properly normalized read out values.

If, actually, all the values read out on a standard banknote are amplified with such normalization coefficients that the ratios between the read out values and the thusly normalized ones are all equal to the unity, the result is that all the values, readout and normalized, will be equal to each other and also to their mean value, which will be equal to anyone of said normalized values equal to one another, so that the difference or error or deviation between the mean and each normalized value will be nil.

It can be appreciated from the foregoing, therefore, that a banknote checking operation based on the values of a chromatic ratio can thus be reduced to a checking of the banknotes based on the differences or errors or deviations from their average of the readout and normalized values so as to give the same normalized value for the standard banknote.

Thus, according to a feature of the present invention, the banknote checking method consists in amplifying each read out value, according to an amplification coefficient of its own, up to a normalized value, in carrying out the computation of the average of all the read out and normalized values, in detecting the error or deviation of each normalized value relative to said average and lastly in verifying that said errors or deviations lie within preselected calibration ranges or banknote acceptance range.

As a matter of fact, inasmuch as said calibration ranges for said errors or deviations can be made very narrow, as has been practically ascertained, the result is that the selectivity which can be obtained relative to the forged pieces is considerably improved. On the other hand, the normalization of the readout values, which is necessary according to the present method in order to reduce a ratio check to a check of difference or error or deviation and for being able to compare all such values which are not in the same order of magnitude, with a single value, that is to say their average, also permits to annul all the possible differences in behaviour of the individual components of the banknote reader, which provide to measure and to amplify the light signals, since the amplification coefficients of the amplifiers of the different banknote readers shall always be regulated so that any banknote, even a forged one, as introduced in said different readers, may supply rigorous equal normalized signals irrespective of the different kinds of readout devices.

Then, according to another feature of the present invention, said amplification coefficients, according to which the read out values are amplified up to a normalized value, are so selected that there might be obtained for a theoretical standard banknote, normalized values all equal to one another.

Thus, for said standard ideal banknote said errors or deviations will all be equal to zero, as it must be on account of the foregoing. Not only this, but such errors or deviations will also be nil for all the banknotes the chromatic shades of which, even being considerably different from one another, are, in relationship withr that of said standard banknote, in a constant ratio with that of the standard banknote, as it must be in order that all the possible types of genuine banknotes may be accepted. As a matter of fact, if a dark banknote is checked in which all the read out values are attenuated, even by 25% over those of the ideal standard banknote of calibration, it is apparent that also the average of the normalized value will be attenuated by 25% and thus the errors or deviations will be nil.

Then, to the end of making such errors or deviations, which are not in the same order of magnitude and can be either positive or negative, all comparable with a single adjustable threshold value which establishes the acceptability boundary for a banknote, that which permits to reduce all said calibration and acceptability ranges of the banknote to a single calibration range which is valid for all the read out value with a consequent apparent saving of components in the checking apparatus as well as a simplification of the calibration step which is thus reduced to the regulation of a single adjusting member, such as a potentiometer; according to another feature of this invention the banknote checking method consists in amplifying each detected error or deviation, according to an amplification coefficient of its own to be statistically deduced, up to a normalized value, in selecting and converting the maximum normalized error or deviation from the negative to the positive, in selecting the maximum normalized error or deviation as to its magnitude and comparing said absolute maximum normalized error with a preselected threshold value, which is the only one and is adjustable, for establishing the banknote acceptance boundary.

Finally, according to the present method a banknote is substantially analyzed in a point of its only, the one which gives the worst value of normalized error or deviation but this fact, apparently, does not prejudice the function of discarding the forged pieces since, if the deteched normalized error does not exceed the value of the acceptance threshold, for this same reason such treshold will not be exceeded by the other detected normalized errors which have a smaller magnitude.

In order, then, that banknotes might be accepted which are exceptionally soiled or clear-toned forged notes, according to an additional feature of the present invention, said average of all the read out and normalized values is compared with a preselected reference value and the error or deviation from the average from said reference value is normalized, by amplifying it according to an amplification coefficient which is derived statistically, and said normalized value is then exploited, similarly to all the other normalized errors or deviations aforesaid relative to said read out and normalized values, for the selection of said maximum absolute error.

By so doing, the check of the average is reduced, it also, to said single banknote acceptability threshold, since the error of the average, being normalized, can be compared with all the other normalized errors or deviations. As a matter of fact, if the normalized error relative to said average will exceed as to its magnitude all the other normalized errors, it will be such normalized error which, selected as the maximum absolute error, will be compared with said preselected threshold value.

A further feature of the present invention is the fact that the apparatus for checking the banknotes according to the method set forth above is formed by a set of so many operational variable-gain amplifier as there are points in the banknote to be checked, and to the inputs of which there will be sent all the read out values supplied by said photosensitive elements and the outputs of which, that supply normalized values, are connected, each and respectively, to a summation node and to the input of an adding and inverting amplifier, which latter delivers at its output the sign-inverted average of the normalized values present at its input, the output of which is connected, in its turn, to all said summation nodes and also to another summation node to which is also connected the output of a generator of a reference signal or value for said average, all those summation nodes which supply error or deviation signals or values being further connected, each, to the input of an operative variable-gain amplifier the output of which, that supplies a normalized value of error, is connected to a selection circuit of the normalized maximum absolute error, the output of which is connected, in turn, to the input of a comparator to which there is also fed the output of a generator of a threshold signal or value which is the calibration of maximum normalized error and thus the acceptance limit for the banknote to be checked.

According to another feature of the present invention, said variable gains of said set of operational amplifiers are so calibrated that the values read out on a standard banknote are all amplified to the same normalized value, whereas said variable gains of said operational amplifiers connected to said summation nodes are calibrated according to statistically determined values.

According to yet another feature of the present invention, the selection circuit for the maximum absolute normalized error or deviation is composed by a set of as many diodes arranged in inverted direction as there are said summation nodes, the inputs of which are connected to the outputs of said operational amplifiers connected to said summation nodes and the outputs of which are connected to each other and to the input of an inverter the output of which, in its turn, is connected via a diode arranged in the direct sense, to the common output of another set of as many diodes arranged in the direct sense as there are said summation nodes, the inputs of which are also connected to said outputs of said operational amplifiers connected to said summation nodes, said common output being furthermore connected to the input of said comparator.

By so doing, in fact, the network of inverted diodes selects only the maximum among all the negative normalized errors or deviations which are present, since said maximum, which appears at the common output of the inverted diodes network, cuts off all the other diodes of the network. On the other hand, this maximum selected negative normalized error or deviation, inverted as to its sign and thus made positive by the inverter, is sent to the network of direct diodes which selects, in a manner similar to the previous one, only the highest among all the normalized positive errors or deviations which are present, but since among these normalized errors or deviations is considered also that maximum negative normalized error or deviation, it is apparent that what is delivered to the comparator input is the maximum normalized error or deviation in absolute.

The invention is now better explained with reference to the accompanying drawings which illustrate a preferred practical embodiment given by way of example only and without limitation since constructional or technological changes, such as the use of digital rather than analogical components, will always be possible without departing from the scope of the present invention.

In the drawings

In said FIGURES of the drawings corresponding parts are indicated by the same reference numerals.

Figure 1:
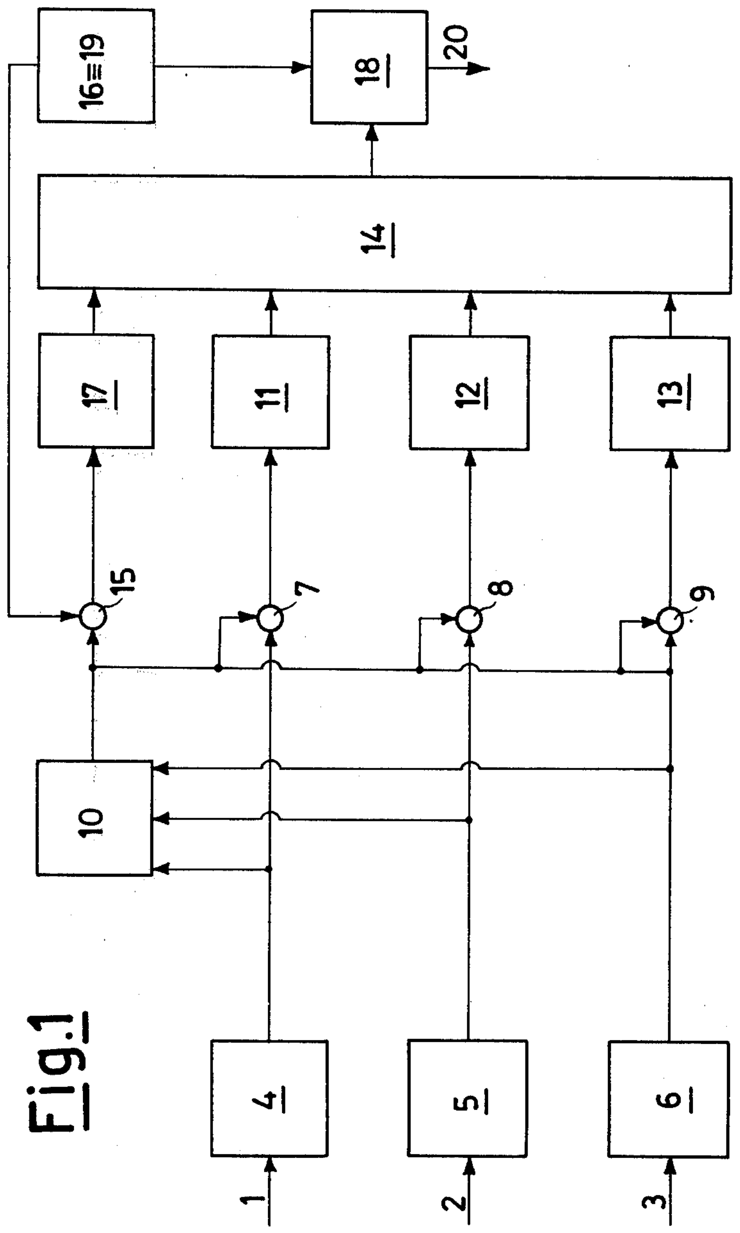
FIG. 1 shows a block diagram of the sequential stages for checking a banknote according to the method of the present invention, the checking step being limited to three readout points only on the banknote.

Having now reference to FIG. 1, the numerals 1, 2 and 3 symbolically indicate the values read out in correspondence with three preselected readout points on a banknote to be checked, which are normalized in normalization stages 4, 5 and 6, respectively, and then compared in correspondence with the summation nodes 7, 8 and 9, with their inverted average (inverted-sign) as supplied by an average-computing stage 10 to which said normalized values have also been delivered. In correspondence with said summation nodes 7, 8 and 9 there will be present the errors or deviations of each normalized value relative to said average and these errors or deviations are normalized in normalization stages 11, 12 and 13, respectively, and then delivered to a stage or circuit for selecting the maximum absolute normalized error or deviation 14. On the other hand, said inverted-sign average as supplied by the average-computer stage 10 is also compared, in correspondence with the summation node 15, with a preselected reference value as supplied by a generator of signals 16, which is adjustable, and the relevant error or reviation, normalized in the normalization stage 17, is likewise delivered to the said stage or circuit 14 for selecting the absolute maximum normalized error or deviation. Said absolute maximum normalized error or deviation, as selected by the stage or circuit 14, is finally compared, in a comparison stage 18, with a preselected threshold stage as supplied by an adjustable signal generator 19 (in FIG. 1 the two generators 16 and 19 are symbolically indicated by a single block), so that, at the output of said comparison stage 18 a logical ON/OFF signal 20 will appear, of acceptance or rejection of the banknote according to whether said maximum error is lower, or higher, respectively than said threshold value.

Figure 2:
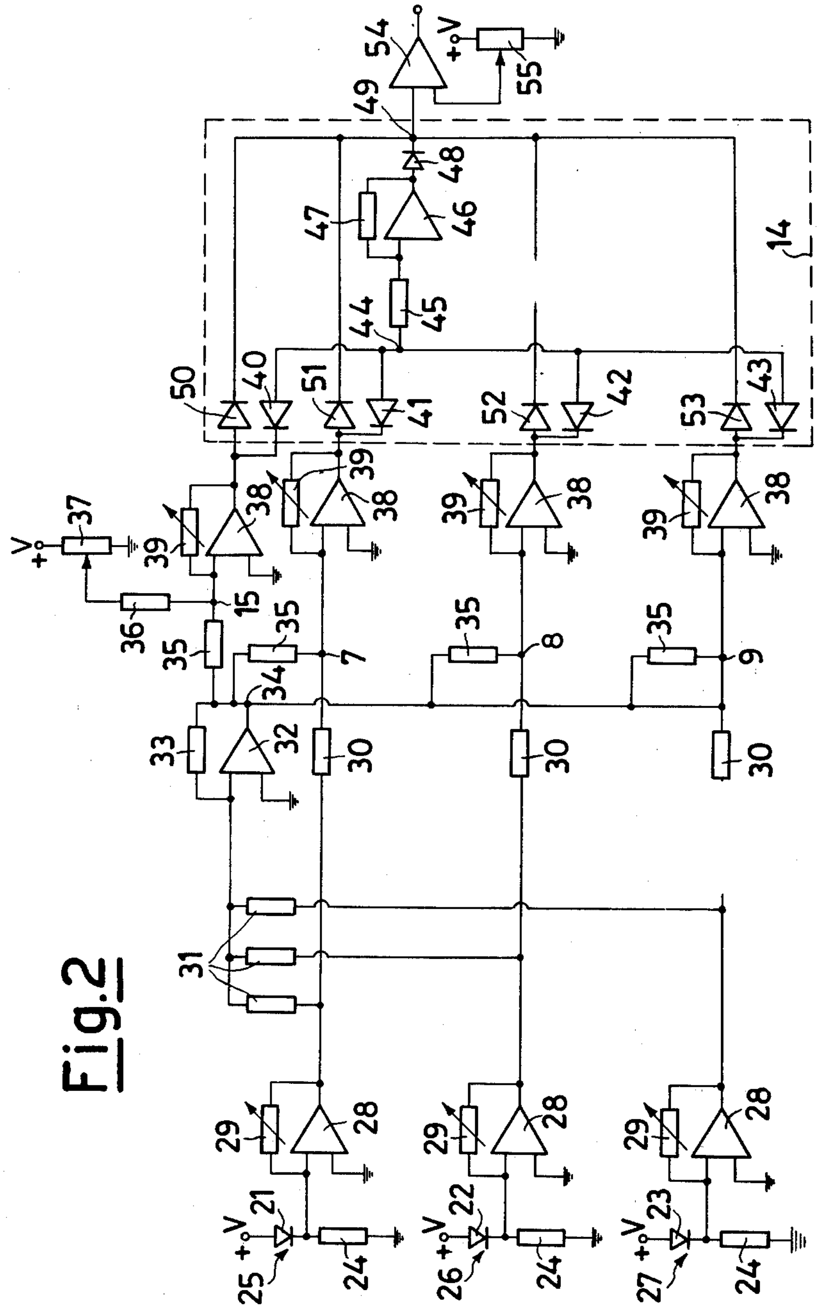
FIG. 2 shows the circuitry daigram of the apparatus according to this invention for checking a banknote with the method of the invention and according to the diagram of FIG. 1.

The aforesaid read out values 1, 2 and 3 are substantially the electric signals supplied by the photosensitive elements 21, 22 and 23 (see especially FIG. 2) which, inserted each in series with a resistor 24 in a circuit fed by a positive voltage +V, measure the light, 25, 26 and 27, respectively, which is reflected or passes through the banknote being checked in correspondence with the preselected readout points aforesaid. These electric signals, which are obviously proportional to the chromatic shades of said readout points of the banknote, are sent and amplified in normalization stages 4, 5 and 6 to provide a plurality of normalized signals each representative of a normalized value for one of said electrical signals. Each normalization stage comprises a normalizing operational amplifier 28 the gain of which can be varied by acting upon its feedback variable resistor 29. These feedback variable resistors 29 of the operational amplifiers 28 and thus their gains are calibrated, in the case in point, so that the values which are read out by the photosensitive elements 21, 22 and 23 on a standard banknote are all amplified by the operational amplifiers 28 up to the same normalization value. The outputs of lack of the operational amplifiers 28 are then respectively connected to the summation nodes 7, 8 and 9, respectively and to the input of said average-computing stage 10 via two equal resistors 30 and 31. The average-computing stage 10 comprises a summing-inverting amplifier 32 the feedback resistor 33 of which has a value equal to 1/n of that of the equal input resistors 31, wherein n is the number of readout points in which the banknote is analyzed. Thus, in the present case, the resistor 33 is one third of the resistor 31. Thus, in fact, at the output 34 of the amplifier 32 there will be present an average signal which is equal to the sign-inverted average of the values of the signals present at the input of said amplifier. The output 34 of the amplifier 32 is then connected, via resistors 35 equal to the resistors 30, to the summation nodes 7, 8 and 9 so as to provide at each of said nodes a primary deviation signal which is representative of the deviation between the respective normalized signals and the average signal. Output 34 is also connected to a summation node 15, to which is likewise connected, via a resistor 36 equal to the resistor 35, the output of adjustable first reference signal generator 16 which is substantially a potentiometer 37 fed by the positive voltage +V so as to provide an average deviation signal representative of the deviation between the value of the average signal and the value of the first reference signal generated by voltage +V. The summation nodes 15, 7, 8 and 9 are in addition respectively connected to the inputs of the normalization stages 17, 11, 12 and 13, each of which is an operational amplifier 38 the gain of which can be varied by manipulating the variable feedback resistor 39 thereof. For purposes of clarity, normalization stage 17 is referred to as an average deviation normalizer, and each stage 11, 12 and 13 is referred to as a primary deviation normalizer, each normalizer 17, 11, 12 and 13 being a variable gain operational amplifier 38. The output of the average deviation normalizer of stage 17 is a normalized average deviation signal which is representative of a normalized value for the deviation between the value of the average signal and that of the first reference signal. The output of each of the primary deviation normalizers of stages 11, 12 and 13 is a normalized primary deviation signal representative of a normalized value for the respective primary deviation signal received at its input. The variable feedback resistors 39 of the operational amplifiers 38, and thus their gains, are calibrated, in the present case, according to values which are statistically determined by the scrutiny of a sufficiently large number of genuine banknotes. The outputs of the operational amplifiers 38 of stages 17, 11, 12 and 13 are then delivered to the stage or circuit 14 for the selection of the absolute maximum normalized error or deviation. Maximum deviation circuit or stage 14 comprises a first set of diodes, there being in said first set as many diodes as there are summation nodes. As illustrated in FIG. 2, there are four diodes, namely 40, 41, 42 and 43, respectively, which are connected in the inverted sense, respectively, between the outputs of the operational amplifiers via a resistor 45, to the input of an inverting amplifier 46 the feedback resistor 47 of which has the same value as the resistor 45. In addition, the output of the inverting amplifier 46 is connected via a diode 48 arranged in the direct sense, to the common output 49 of another set of as many diodes, in the case in point the four diodes 50, 51, 52 and 53, which are connected in the direct sense between the common output 49 and the outputs of the operational amplifiers 38. The maximum deviation circuit 14 in effect combines the normalized primary deviation signals and the normalized average deviation signal to provide at output 49 a maximum deviation signal representative of the sum of the values of the magnitudes of said normalized primary deviation signals and said normalized average deviation signal. Output 49, is finally connected to the input of a comparator 18, the latter being substantially composed by a no-feedback operational amplifier 54 to which is also connected the output of second adjustable reference signal generator 19, this generator being substantially composed by a potentiometer 55 fed by the positive voltage +V. Comparator 18 compares the maximum deviation signals at output 49 with the second reference signal of generator 19 such that the output of comparator 18 is indicative of whether the maximum deviation signal is within an acceptable range.

I claim:

1. An apparatus for checking banknotes by utilizing electrical signals provided by photosensitive elements in correspondence with a preselected set of points on said banknotes, said apparatus comprising: a set of as many operational variable-gain amplifiers as there are said readout points on the banknotes to the inputs of which are sent said values as read out by said photosensitive elements and the outputs of which, which deliver normalized values, are connected, each respectively, to a summation node and to the input of a single summing-inverting amplifier, the latter supplying at its output the sign-inverted average of said normalized values present at its input, the output of which is connected, in its turn, to all the aforesaid summation nodes as well as to a further summation node to which there is also connected the output of a generator of a reference signal or value for said average, all said summation nodes which deliver error or deviation signals being moreover connected, each, to the input of a variable-gain operational amplifier, the output of which delivering a normalized error value is connected to a circuit of selection of the absolute maximum normalized error or deviation, the output of which, in its turn, is connected to the input of a comparator to which there is also delivered the output of a generator of a threshold signal or value which is the calibration parameter of the maximum normalized error and thus the acceptability boundary for the banknotes to be checked.

2. An apparatus according to claim 1, characterized in that said variable gains of said set of operational amplifiers are so calibrated that the values read out on a standard banknote are all amplified to a same normalized value, whereas said variable gains of said operational amplifiers connected to said summationnodes are calibrated according to statistically derived values.

3. An apparatus according to claim 1, characterized in that said circuit for the selection of the absolute maximum normalized error or deviation comprises a set of as many diodes arranged in the inverted sense as there are said summing nodes, the inputs of which are conntected to the outputs of said operational amplifiers connected to said summation nodes and the outputs of which are connected mutually to each other and to the input of an inverter, the output of which is connected, in its turn, through a diode arranged in the direct sense, to the common output of a set of as many diodes arranged in the direct sense as there are the aforesaid summation nodes, the inputs of which are likewise connected to said outputs of said operational amplifiers connected to said summation nodes, said common output being connected to the input of said comparator.

4. An apparatus according to claim 1, characterized in that said generator of a reference signal or value for said average and said generator of a threshold signal or value for said absolute maximum normalized error or deviation are composed, each, by a potentiometer which is fed by a constant positive voltage.

5. A method for checking the genuineness of a banknote by utilizing signals provided by photosensitive elements in correspondence with a preselected set of points on said banknote, said method comprising the steps of:

(a) amplifying each signal provided by each photosensitive element according to a first predetermined amplification coefficient particular to each point on the banknote up to a normalized value so as to provide a plurality of normalized signals;
(b) processing said normalized signals to provide an average signal representative of the average of the values of said normalized signals;
(c) comparing said average signal with each of said normalized signals to provide a plurality of primary deviation signals;
(d) detecting that the value of each of said primary deviation signals lies within a preselected calibration range.

6. A method according to claim 5 which further comprises the steps of:

(e) amplifying each of said primary deviation signals according to a second predetermined amplification coefficient particular to each point on said banknote to provide a plurality of normalized primary deviation signals;
(f) processing said normalized primary deviation signals to provide a maximum normalized deviation signal which is representative of the sum of the values of the magnitudes of said normalized primary deviation signals; and
(g) comparing said maximum normalized deviation signal with a preselected threshold signal which establishes the boundary of acceptability of the banknote.

7. A method according to claim 6 in which the said first amplification coefficients according to which each signal provided by each photosensitive element is amplified to provide a normalized signal are so selected that there are obtained for a standard genuine banknote normalized signals having values which are all equal to one another.

8. A method according to claim 5 which further comprises the step of:

(e) comparing said average signal with a predetermined reference signal to provide an output indicative of the acceptability of the test banknote.

9. A method according to claim 5 in which the said first amplification coefficient according to which each signal provided by each photosensitive element is amplified to provide a normalized signal are so selected that there are obtained for a standard genuine banknote normalized signals having values which are all equal to one another.

10. A method for checking the genuineness of a banknote by utilizing signals provided by photosensitive elements in correspondence with a preselected set of points on said banknote, said method comprising the steps of:

(a) amplifying each signal provided by each photosensitive element according to a first predetermined amplification coefficient particular to each point on the banknote up to a normalized value to provide a plurality of normalized signals;
(b) processing said normalized signals to provide an average signal representative of the average of the values of said normalized signals;
(c) comparing said average signal with each of said normalized signals to provide a plurality of primary deviation signals;
(d) comparing said average signal with a predetermined reference signal to provide an average deviation signal representative of the deviation between the value of said average signal and that of said predetermined reference signal;
(e) amplifying each of said primary deviation signals and said average deviation signal according to a second predetermined amplification coefficient particular to each point on said banknote to provide a plurality of normalized primary deviation signals and a normalized average deviation signal;
(f) processing said normalized primary deviation signals and said normalized average deviation signal to provide a maximum normalized deviation signal which is representative of the sum of the values of the magnitudes of said normalized primary deviation signals and that of said normalized average deviation signal; and
(g) comparing said maximum normalized deviation signal with a preselected threshold signal which establishes the boundary of acceptability of the banknote.

11. A method according to claim 10 in which the said first amplification coefficients according to which each signal provided by each photosensitive element is amplified to provide a normalized signal are so selected that there are obtained for a standard genuine banknote normalized signals having values which are all equal to one another.

12. A method according to claim 10 in which the second amplification coefficients for amplifying said primary deviation signals and such average deviation signal are statistically deduced.

13. An apparatus for checking the genuineness of a banknote by utilizing electrical signals provided by photosensitive elements in correspondence with a preselected set of points on said banknote, said apparatus comprising:

(a) means for amplifying each of said electrical signals according to a predetermined amplification coefficient associated with each of said points to provide a plurality of normalized signals each of which being representative of a normalized value for one of the electrical signals provided by the photosensitive elements;
(b) means responsive to each of said normalized signals for providing an average signal representative of the average of the values of said normalized signals;
(c) means jointly responsive to said normalized signals and said average signal for providing a plurality of primary deviation signals, each of which being representative of the deviation between the value of each of said normalized signals and the value of said average signal; and
(d) means responsive to said primary deviation signals for providing an output indicative of whether said primary deviation signals are within an acceptable range.

14. An apparatus according to claim 13 wherein the amplifying means is a variable gain operational amplifier for each of the points on said banknote to be checked.

15. An apparatus according to claim 14 in which the variable gains of said variable gain operational amplifiers are so calibrated that when a genuine banknote is used as a standard, the normalized signals provided at the output of said amplifiers are all equal.

16. An apparatus according to claim 13 in which the means responsive to each of said normalized signals for providing an average signal representative of the average of the values of said normalized signals is a summing inverting amplifier.

17. An apparatus according to claim 13 which further comprises:

(e) means jointly responsive to said average signal and a first predetermined reference signal for comparing said average signal with said first predetermined reference signal to provide an average deviation signal representative of the deviation between the value of said average signal and that of said first predetermined reference signal;
(f) means responsive to said average deviation signal for amplifying said average deviation signal according to a predetermined average amplification coefficient to provide a normalized average deviation signal representative of a normalized value for the deviation between the value of said average signal and that of said first predetermined reference signal;
(g) means responsive to said primary deviation signals for amplifying each of said primary deviation signals according to an amplification coefficient associated with each of the points on said banknote to provide a plurality of normalized primary deviation signals, each of which being representative of a normalized value for its respective primary deviation signal;
(h) means jointly responsive to said normalized average deviation signal and said normalized primary deviation signals for combining said normalized average deviation signal and said normalized primary deviation signals to provide a maximum deviation signal representative of the sum of the values of the magnitude of said normalized average deviation signal and those of said normalized primary deviation signals; and
(i) means jointly responsive to said maximum deviation signal and a second predetermined reference signal for comparing said maximum deviation signal and said second predetermined reference signal for providing an output indicative of whether said maximum deviation signal is within an acceptable range.

18. An apparatus for checking the genuineness of a banknote by utilizing electrical signals provided by photosensitive elements in correspondence with a preselected set of points of said banknote, said apparatus comprising:

(a) a set of normalizing operational amplifiers, each of which being a variable gain operational amplifier having an input for receiving one of said electrical signals, each of said amplifiers being responsive to said electrical signal received at its input for amplifying said respective signal according to a predetermined amplification coefficient to provide at its output a normalized signal representative of a normalized value for the respective electrical signal received at its input;

(b) a summing inverting amplifier responsive to said normalized signals for providing at its output an average signal representative of the sign inverted average of the values of said normalized signals;

(c) circuit means for connecting the outputs of said set of normalizing operational amplifiers to the input of said summing inverting amplifier;

(d) circuit means for connecting each of the outputs of said set of normalizing operational amplifiers with the output of said summing inverting amplifier to provide a plurality of primary deviation signals each of which being representative of the deviation between the value of each of said normalized signals and the value of said average signal;

(e) circuit means for connecting the output of said summing inverting amplifier with a first predetermined reference signal to provide an average deviation signal representative of the deviation between the value of said average signal and that of said first predetermined reference signal;

(f) an average deviation normalizer, said average deviation normalizer being a variable gain operational amplifier for receiving said average deviation signal at its input and amplifying said average deviation signal according to a predetermined amplification coefficient particular thereto to provide at its output a normalized average deviation signal representative of a normalized value for the deviation between the values of said average signal and said first predetermined reference signal;

(g) a set of primary deviation normalizers each of which being a variable gain operational amplifier having an input for receiving one of said primary deviation signals, each of said primary deviation normalizers being responsive to said primary deviation signal received at its input of amplifying said respective primary deviation signal according to a predetermined amplification coefficient particular thereto to provide at its output a normalized primary deviation signal representative of a normalized value for the primary deviation signal received at its input;

(h) maximum deviation circuit means having a plurality of inputs for receiving each of said normalized primary deviation signals and said normalized average deviation signal, and combining said normalized primary deviation signals and said normalized average deviation signal to provide at its output a maximum deviation signal representative of the sum of the values of the magnitudes of said normalized primary deviation signals and that of said normalized average deviation signal; and (i) a comparator, the input of which being connected to the output of said maximum deviation circuit means and to a second predetermined reference signal for comparing said maximum deviation signal with said second predetermined reference signal to provide said comparator with an output indicative of whether said maximum deviation signal is within an acceptable range.

19. An apparatus according to claim 18 wherein the gain of each of said set of normalizing operational amplifiers which provide said normalized signals at their outputs is so calibrated that the outputs of each of said normalizing operational amplifiers are all equal, and the gains of said set of primary deviation normalizers and said average normalizer are set according to statistically derived values.

20. An apparatus according to claim 18 in which said maximum deviation circuit means comprises:

a first set of diodes, the anodes of one of said diodes being connected to the output of said average deviation normalizer, the anodes of each of the other diodes in said first set being connected to the output of one of said primary deviation normalizers, the cathodes of said first set of diodes being connected to one another;

a second set of diodes, the cathode of one of said diodes being connected to the output of said average deviation normalizer, the cathodes of each of the other diodes in said second set of diodes being connected to the output of one of said primary deviation normalizers, the anodes of said second set of diodes being connected to one another;

an inverter;

circuit means for connecting the anodes of said second set of diodes to the input of said inverter;

circuit means for connecting the output of said inverter to the cathodes of said first set of diodes; and circuit means for connecting the cathodes of set first set of diodes to the input of said comparator.

* * * * *